Figure 1:
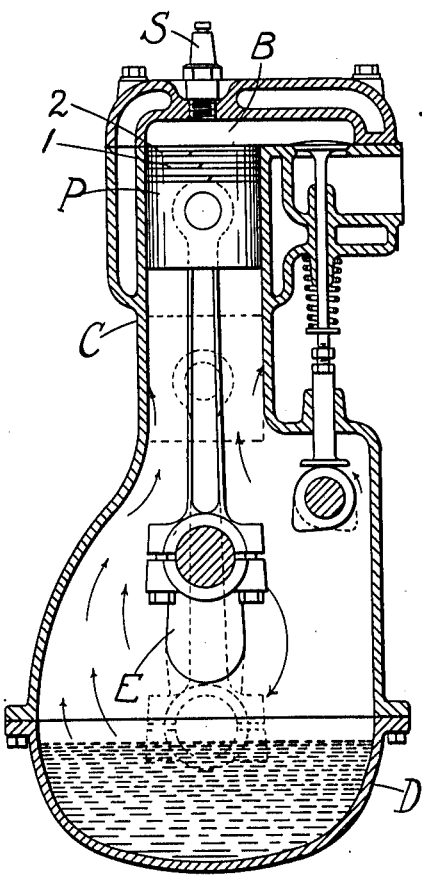

A. J. MUMMERT.
PISTON LUBRICATION.
APPLICATION FILED MAR. 6, 1917.

1,313,905.  Patented Aug. 26, 1919.

WITNESSES:
Harry A. Beiny
[signature]

INVENTOR.
Arden J. Mummert
BY
[signature]
ATTORNEY.

UNITED STATES PATENT OFFICE.

ARDEN J. MUMMERT, OF ST LOUIS, MISSOURI, ASSIGNOR TO McQUAY-NORRIS MANUFACTURING COMPANY, OF ST. LOUIS, MISSOURI, A CORPORATION OF MISSOURI.

PISTON LUBRICATION.

1,313,905. Specification of Letters Patent. Patented Aug. 26, 1919.

Application filed March 6, 1917. Serial No. 152,656.

*To all whom it may concern:*

Be it known that I, ARDEN J. MUMMERT, a citizen of the United States, residing at St. Louis, State of Missouri, have invented certain new and useful Improvements in Piston Lubrication, of which the following is a full, clear, and exact description, reference being had to the accompanying drawings, forming a part hereof.

The present improvement is particularly directed to the lubrication of pistons of internal combustion engines, the object sought being to maintain a proper lubrication of the rubbing surfaces of the piston and inner walls of the cylinder without danger of the oil or lubricant reaching the combustion chamber. In internal combustion engines considerable clearance is necessary between the body of the piston and the inner walls of the cylinder to allow for the excessive expansion which the parts undergo by reason of their exposure to the high temperatures developed by the burning gases. This clearance permits of a ready flow of the oil or lubricant between the piston and cylinder walls, the oil under the circumstances having an undue tendency to flow into the combustion or expansion chamber. While a generous clearance has the advantage in that it permits a thorough flooding of the packing rings with which the piston is usually provided, thereby insuring a highly efficient system of lubrication and packing, it is open to the objection in that it fails to prevent the flow of the oil into the combustion chamber. Prior to my invention this objection was overcome and the flow of the oil into the combustion chamber prevented, by limiting the quantity of oil supplied to the piston; but this reduction in the oil supply in turn impaired the efficiency of the packing rings, it being essential that there be at all times a sufficient quantity of lubricant between the rubbing surfaces aforesaid. Under my invention a maximum efficiency of the packing rings is maintained by keeping the clearance aforesaid and the packing rings permanently flooded, and by keeping between the cylinder walls and the outer face of the ring nearest the combustion chamber, the necessary film of oil to insure proper lubrication, while at the same time excluding any appreciable or harmful amount of oil from said chamber. It is a well known fact that presence of oil in the combustion chamber gives rise to engine trouble, as a result of uneven explosions due to the presence of hydrocarbons or combustible matter emanating from sources other than the mixture of air and gases to be exploded. Besides, the residue resulting from the burning of the oil in said chamber produces a heat-insulating layer or deposit on the walls of the chamber which prevents successful cooling of the same, and hence interfering with the operation of the engine and impairing its efficiency. In the present embodiment of my invention I make use of a plurality of packing rings, which, with the exception of the ring nearest the combustion chamber, permit not only of a thorough flooding of the rings, but of a free flow of the oil through the clearance between the inner walls of the cylinder and the body of the piston and outer faces of the rings, the ring nearest the combustion chamber intercepting said flow and operating as a seal against the passage of the oil into the combustion chamber, although permitting the retention of a permanent lubricating oil film between the outer face of the ring and the inner wall of the cylinder. Under the circumstances therefore the rings other than the ring nearest the combustion chamber operate in the strict sense as packing rings, while the oil-intercepting ring operates both as a packing ring, and as a seal preventing the passage of oil into the explosion chamber. The particular construction of the sealing ring or of the packing rings is immaterial. An example of the former however may be found in U. S. Patent No. 1,210,674 issued to me under date of January 2, 1917. The advantages of the invention will be apparent from the following detailed description in connection with the accompanying drawings in which—

Figure 5:
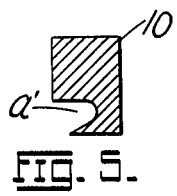
Figure 6:
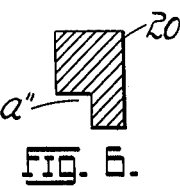
Figure 7:
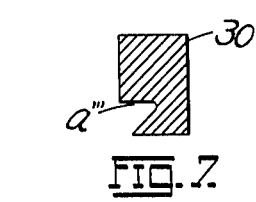
Figure 3:
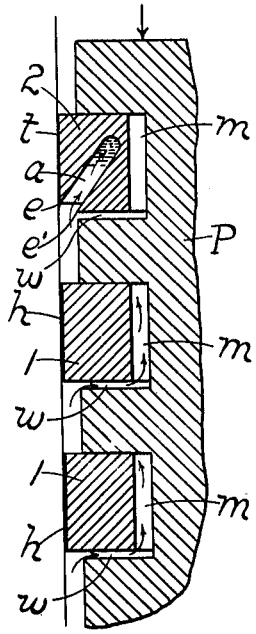
Figure 4:
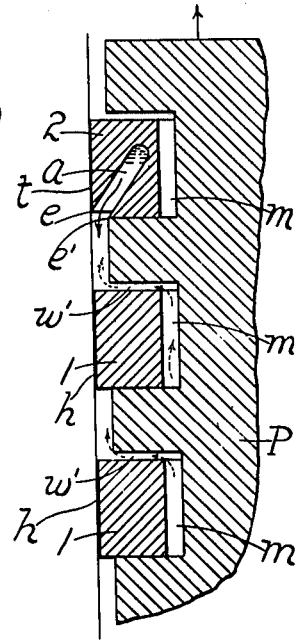
Figure 2:
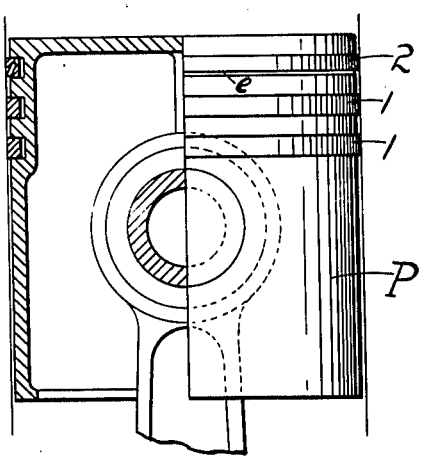

Figure 1 represents a vertical middle longitudinal section through the cylinder of an explosive engine and its crank-case, with parts in elevation, showing my invention applied thereto; Fig. 2 is a half elevation and half longitudinal middle section through the piston and its packing rings; Fig. 3 is an enlarged longitudinal section through the wall of the piston and through the packing rings showing my system of lubrication, and showing the position of the rings on a forward or downstroke of the piston; Fig. 4 is a similar section showing the position of the rings at the moment the piston is beginning its reverse or upstroke (or has reached the end of its forward or downstroke); and Figs. 5, 6 and 7 are cross-sections of modified forms of sealing rings.

Referring to the drawings, and for the present to Figs. 1 to 4 inclusive, C, represents the cylinder of a conventional explosive engine, D, the crank-case, P, the piston, S, the spark plug, the walls of the cylinder being kept supplied with oil by the splashing action of the crank E dipping into the oil in the crank-case with each forward or "down" stroke of the piston, as well understood in the art, such forward stroke being imparted to the piston by the explosion of the charge in the combustion or explosion chamber B in which the spark plug terminates. The features thus far described are well known by those skilled in the art but are alluded to, in order to better bring out the purposes and advantages of the invention proper. In the present embodiment of my invention I provide the piston with one or more packing rings 1, 1, said rings serving in the capacity and performing the true function of packing rings, that is to say, serving as means for preventing leakage or escape of the motor fluid, while at the same time permitting the necessary freedom of circulation of the oil between the inner walls of the cylinder and the outer faces of the rings to keep the rubbing surfaces permanently lubricated. In engines of the character here referred to, that is to say explosive engines, (including slow combustion engines) it is detrimental to the efficiency of the engine for reasons above stated to have the oil enter the combustion or explosion chamber B. My invention therefore contemplates the arrest of the oil in its flow toward the chamber B before said chamber is reached. This I accomplish by interposing between the ring or rings 1 and the end of the piston facing the explosion chamber, an oil sealing ring 2 on the order of that shown in my U. S. Patent No. 1,210,674, above referred to, or any ring which in a measure will serve as an equivalent thereof. This ring as described in said patent is provided with an annular basin or receptacle $a$ one wall of which terminates in a scraping edge $e$ which scrapes the oil from the cylinder walls with each forward or "down" stroke of the piston, the oil being gathered by the basin $a$ in such stroke, and discharged therefrom over the edge $e'$ of the opposite wall of the basin against the walls of the cylinder on the return or upstroke, thereby maintaining a layer $h$ of oil on the cylinder walls for lubricating the rubbing surfaces of said walls and packing ring or rings 1. The oil scraped by the edge $e$ with each forward stroke is caused to flow into the basin $a$, leaving only a sufficient lubricating, and practically permanent (non-flowing) film $t$ of oil between the rubbing surfaces of the sealing ring 2 and the inner walls of the cylinder.

The operation can best be described in connection with Figs. 3 and 4 and is substantially as follows: As well understood in the art there is more or less play between the packing rings and the side walls of the piston grooves $m$ between which the rings are confined. Since the rings, by reason of inertia and friction will always lag behind the piston, it follows that as the piston is making its forward or "down" stroke (Fig. 3) the rings will bear forcibly against the upper side walls of the several grooves $m$, leaving the opposite walls released or free from the adjacent sides of the rings. This permits a large percentage of the oil gathered from the cylinder walls by the outer edges of the rings, 1, 1, to flow behind the rings into the clearances formed between the bottoms of the piston grooves and the inner faces of the rings (see arrows Fig. 3) thereby flooding the rings, a small percentage of the oil in the shape of a layer $h$ flowing between the outer faces of the rings and the inner walls of the cylinder. In the case of the rings 1, 1, no other course than that described is left open for the oil, because as fast as the rings scrape it from the cylinder walls, the oil is piled up against the descending side wall of the ring and naturally seeks an outlet; and since the path of least resistance is the clearance $w$ between said wall and the adjacent side wall of the piston groove, the oil rushes through said clearance behind the ring, a smaller portion $h$ taking a path between the ring and cylinder wall. In the case of the ring 2 however the action is quite different. There, as fast as the oil is scraped by the descending edge $e$, the oil instead of piling up against the side of the ring and seeking an outlet through the clearance $w$, finds immediate relief and rushes into the basin $a$ which is ample to receive all the oil scraped by said edge, only a thin non-flowing film $t$ remaining between the ring 2 and cylinder wall to serve as a lubricating film. The radial tension of the several rings 1, 2, against the cylinder walls is substantially the same, but since the ring 2 is an oil-relieving ring (the bulk of the oil scraped or gathered thereby being accommodated by the basin or pocket $a$), it seals against any positive or flowing movement that portion which may tend to pass between it and the walls of the cylinder, this portion being however reduced to a mere film $t$ which is practically a permanent and non-flowing or relatively stationary sheet operating as a lubricant and as a seal, and preventing any oil from the region below from passing it and flowing into the combustion chamber, That portion of the oil forced through the clearances $w$ into the piston grooves $m$ behind the rings 1, 1, and which may be regarded as the portion by which the rings are flooded, can not pass out of the grooves as long as the upper sides of the rings are in forcible engagement with the corresponding sides of the grooves (Fig. 3) which will be the case during the "down" or forward stroke of the piston; but the moment the piston reaches the end of said stroke and is ready to begin the up or return stroke (to do which it must come to a dead stop), the several rings will be driven by inertia into forcible contact with the bottom sides of the grooves $m$, thus closing the clearances $w$ and leaving corresponding clearances $w'$ between the upper sides of the grooves and adjacent sides of the rings. With this sudden shifting of the rings at the moment preceding the reversal of the piston stroke, the ring-flooding portion of the oil will necessarily be forced from the clearances $w$ through the spaces behind the rings into the clearances $w'$ as shown by the dotted arrows in Fig. 4, although after the piston actually starts in its upward travel this portion of the oil is carried bodily with it. In the up or return stroke the oil accumulated in the basin $a$ on the down stroke will now be discharged against the cylinder walls (see full arrow in Fig. 4) and what does not flow through the clearances $w'$ into the grooves $m$ flows as a sheet or layer $h$ between the rings 1 and cylinder walls, so that so far as the packing rings 1 are concerned, these are kept at all times flooded and lubricated. On the other hand, a permanent lubricating film $t$ (thinner than the films or layers $h$) is maintained between the outer face of the ring 2 and the inner walls of the cylinder; but being practically non-flowing it answers the purpose of a seal thereby converting the ring 2 from a conventional packing ring to a combined packing and sealing ring operating to arrest the flow of the oil and prevent the passage of any appreciable quantities thereof into the combustion chamber.

The cross-section of sealing ring as shown in Figs. 2, 3, and 4 gives the best results in practice, the basin $a$ being sufficiently deep and disposed to best advantage to take care of all the oil scraped by the edge $e$. I do not however wish to restrict myself to this particular cross-section and as examples of other forms, the modifications shown in Figs. 5, 6, 7, might be adopted though with less satisfactory results. In Fig. 5 the sealing ring 10 is provided with a basin $a'$ with one wall only inclined to the axis of the ring. In Fig. 6 the ring 20 is provided with a recess $a''$ with walls at right angles to one another. In Fig. 7 the ring 30 is provided with a basin $a'''$ on the order of that shown in Fig. 5 but with a sharper corner at the bottom of the basin than is the case in Fig. 5. Other modifications might be resorted to, but none of them with as good effect as the basin $a$ of the main form described. Any conventional form of split packing ring 1 or any equivalent thereof may be employed.

Having described my invention what I claim is:

1. In combination with a cylinder of an internal combustion engine, a reciprocating piston, one or more packing rings therefor operating with a maintained flow of oil between them and the walls of the cylinder, an oil-intercepting ring interposed between said packing rings and the end of the piston adjacent the combustion chamber, means on said ring for collecting the oil intercepted by it with one stroke of the piston, and for returning said oil to the cylinder walls with the opposite stroke, thereby confining the flow of the oil to the portions between said oil-intercepting ring and the opposite end of the piston.

2. In combination with a cylinder of an internal combustion engine, a piston, a plurality of packing rings disposed about the piston, a ring positioned near the end of the piston adjacent the combustion chamber and provided with means operating to intercept the oil against passage into said chamber and to collect the same with a forward or downstroke of the piston, the oil thus intercepted and collected being delivered to the walls of the cylinder and to the remaining rings with the return or upstroke of the piston, whereby a flow of oil in either direction is maintained past the remaining rings aforesaid.

3. In combination with a cylinder of an internal combustion engine, a piston, a plurality of packing rings disposed about the piston, a ring mounted near the end of the piston adjacent the combustion chamber and operating to intercept the oil against passage into said chamber with a forward or downstroke of the piston, said ring being provided with a basin for collecting the oil thus intercepted, the basin aforesaid delivering the oil thus intercepted and collected to the walls of the cylinder and to the remaining rings with the return or upstroke of the piston, whereby a flow of oil is maintained past said remaining rings in either direction.

In testimony whereof I affix my signature in presence of two witnesses.

ARDEN J. MUMMERT.

Witnesses:
EMIL STAREK,
JOS. A. MICHEL.